United States Patent [19]

Stillman et al.

[11] 4,373,690
[45] Feb. 15, 1983

[54] DEPLOYABLE SUPPORT STRUCTURE FOR SPACECRAFTS

[75] Inventors: Lee E. Stillman, Lancaster, Va.; Thomas G. Coughlin, Ellicott City, Md.

[73] Assignee: The United States of America as represented by the Secretary of the Navy, Washington, D.C.

[21] Appl. No.: 32,580

[22] Filed: Apr. 23, 1979

[51] Int. Cl.³ .................. B64G 1/30; B64G 1/10
[52] U.S. Cl. .................. 244/173; 136/245; 244/158 R
[58] Field of Search ............... 244/158, 173; 136/89 SA, 89 SD, 244, 245; 160/193, 213

[56] References Cited

U.S. PATENT DOCUMENTS

| | | | |
|---|---|---|---|
| 3,460,992 | 8/1969 | Avilov et al. | 244/173 |
| 3,525,483 | 8/1970 | Van Alstyne | 244/173 |
| 3,587,999 | 6/1971 | Miniovitch et al. | 244/158 |
| 4,133,501 | 1/1979 | Pentlicki | 244/173 |
| 4,155,524 | 5/1979 | Marello et al. | 244/173 |

Primary Examiner—Charles E. Frankfort
Attorney, Agent, or Firm—R. S. Sciascia; A. L. Branning

[57] ABSTRACT

A spacecraft associated deployable support structure which incorporates a passive mechanism for extending an elongated arm, having a supporting surface, from a position adjacent to the spacecraft into a position extensive in relation to the spacecraft, whereby solar cells or instrumentation mounted on the supporting surface can be employed for their intended use.

20 Claims, 12 Drawing Figures

DEPLOYABLE SUPPORT STRUCTURE FOR SPACECRAFTS

BACKGROUND OF THE INVENTION

1. Field of the Invention

The present invention relates to support structures used in conjunction with spacecrafts such as satellites or the like, and more particularly to a deployable support structure which is stowed adjacent to a satellite during launch and which is deployed into an operating position upon attainment of orbit by the satellite.

2. Description of the Prior Art

The size and weight of space vehicles in general, and especially satellites, must be minimized for launch and for space operations where limited power is available. Therefore, any procedure or configuration which can be used to minimize weight and maximize the compactness of a structure is desirable. Aside from these two goals, considerations pertaining to weight distribution assuring proper balance are also important.

In an effort to satisfy all of these requirements, various deployment mechanisms and booms have been suggested in the prior art. One such attempt is shown in U.S. Pat. No. 3,326,497 issued to J. P. Michelson on June 20, 1967 which discloses a solar cell array wherein hingeably affixed panels are deployed by a plurality of motor drives cooperating with the hinges affixing the panels together. The motor drives are electrically powered and therefore add to the overall power consumption of the vehicle to which the array is mounted. In addition, since a plurality motor drives are employed, this multiplicity adds to overall weight.

U.S. Pat. No. 3,525,483 issued to E. M. Van Alstyne on Aug. 25, 1970 discloses a deployment mechanism which comprises a plurality of a spring hinged panels which are cabled together by a cable and pulley arrangement. An electric motor drive is employed to move the cable so that the pulleys are rotated causing the panels to be extended. As in Michelson, the weight and the power consumption of an electric motor drive is not avoided.

U.S. Pat. No. 3,620,846 issued to T. O. Payne on Nov. 16, 1971 shows a deployable cell array which includes a plurality of independent modules each having a panel formed of a plurality of trapezoidal panel segments. A linear actuator is used to move the trapezoidal panel segments along an articulated track while a telescoping driven member is simultaneously employed to extend and therefore erect the trapezoidal sections.

The present invention eliminates the need for an electrically-powered motor drive and therefore eliminates the attendant power consumption and weight problems. The configuration of the present invention is therefore optimum since it also satisfies the needs of compactness and balance.

SUMMARY OF THE INVENTION

Therefore, the primary object of the present invention is to provide a deployable structure for use in conjunction with spacecrafts which provides a supporting surface suitable for use with solar panels or instrumentation of various types.

A further object of the present invention is to provide a deployable support structure for use in conjunction with spacecrafts that adds only minimal weight loads to the spacecraft.

A still further object of the present invention is to provide a deployable support structure for use in conjunction with a spacecraft which is ideally suited for use in pairs on a satellite so that optimum weight distribution and therefore balance is provided in both stowed and deployed conditions.

Still another object of the present invention is to provide a deployable support structure for use in conjunction with a spacecraft which does not rely upon the electrical power capabilities of the spacecraft for power to effect deployment.

Still another further object of the present invention is to provide a deployable support structure which is capable of positioning its supporting surface at a specified location wherein the location may be changed after deployment.

Another further object of the present invention is to provide a deployable support structure wherein the supporting surface can be moved through predetermined rotations substantially about the longitudinal axis thereof after deployment.

Another still further object of the present invention is to provide a deployable support structure which is positively locked into an erected position relative to a spacecraft after deployment.

Another object of the present invention is to provide a deployable support structure for use in conjunction with spacecrafts which is simple in design, relatively inexpensive to manufacture, rugged in construction and efficient in operation.

These objects, as well as further objects and advantages of the present invention will become readily apparent after reading the ensuing descriptions of several non-limiting illustrative embodiments and the accompanying drawing.

A deployable support structure for use in conjunction with a spacecraft according to the principles of the present invention comprises an elongated arm providing a supporting surface, first driven pivot means for pivotally connecting one end of the arm to the spacecraft, the arm being positionable adjacent to the spacecraft and extensible therefrom upon driving of the first driven pivot means, linear actuator means for storing and selectively releasing energy, and means for coupling the linear actuator means to the first driven pivot means, releasing of energy from the linear actuator means driving the first driven pivot means.

DESCRIPTION OF THE PREFERRED EMBODIMENT

Figures 1, 2:
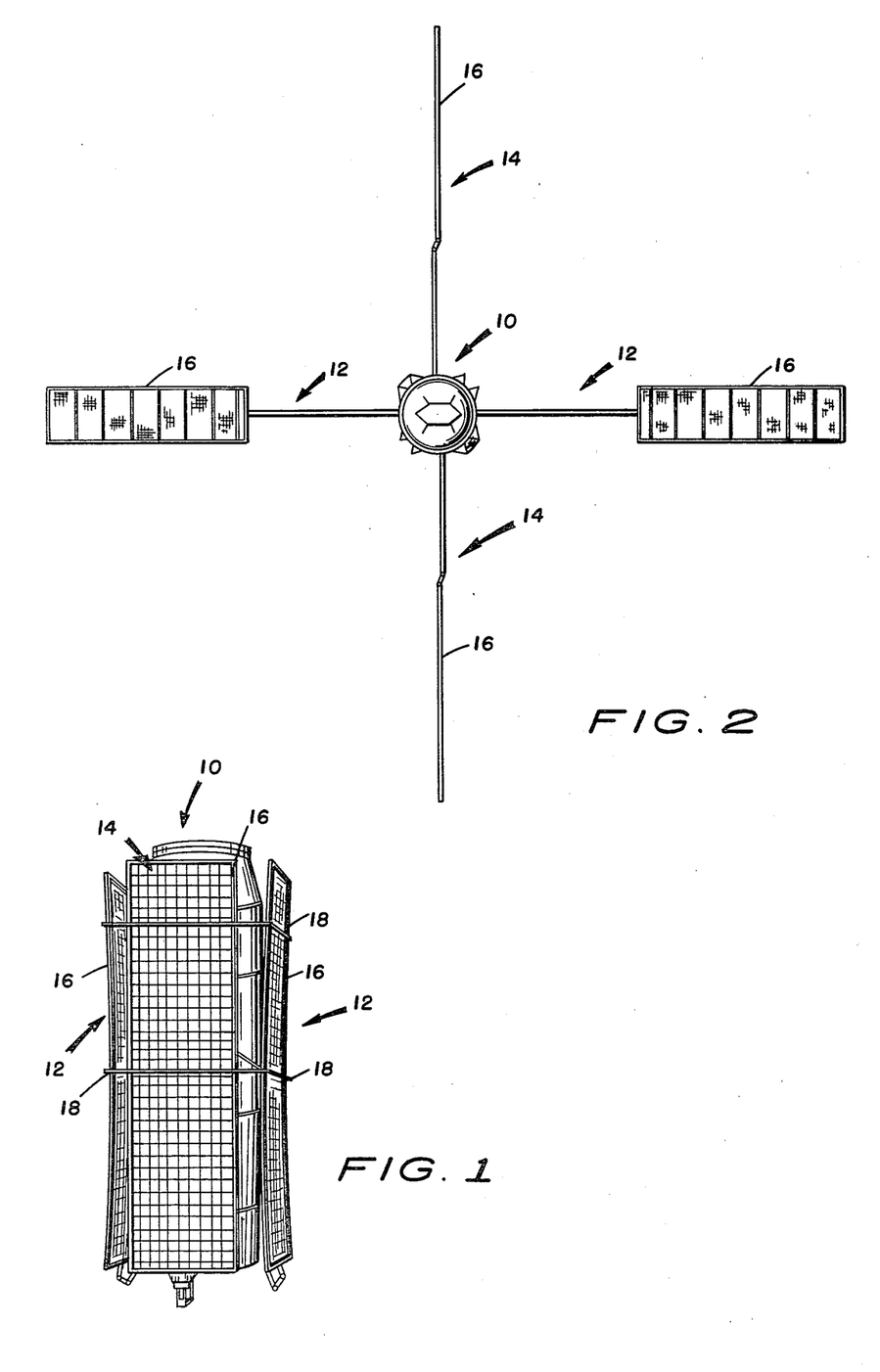
FIG. 1 is a pictorial representation of the two preferred embodiments of the present invention installed on a satellite in a stowed position.
FIG. 2 is a top plan view of the satellite of FIG. 1 illustrating the two embodiments of the present invention in a deployed position.

Referring now to Figures, and more particularly to FIGS. 1 and 2 thereof, there is illustrated therein a satellite 10. The satellite 10 is fitted with two pairs of deployable support structures. A first pair of deployable support structures 12, which are mechanically rotated about the longitudinal axis thereof into a pre-selected position upon their deployment, are operatively connected to the satellite 10. Similarly, a second pair of deployable support structures 14, which are electrically rotatable substantially around the longitudinal axis thereof after deployment, are operably connected to the satellite 10. The deployable support structures 12 and 14 are illustrated supporting a plurality of solar panel arrays 16. The solar panel arrays 16 are shown for purposes of illustrating one type of structure which may be supported. Alternately, various types of test equipment or other structures can be supported by the deployable support structures 12 and 14. The deployable support structures 12 and 14, for example, can be used to deploy reflectors, detectors, communication link components, and various types of system and experimental instrumentation.

The satellite 10 is of the spin stabilization type and therefore the deployable support structures 12 and 14 must be deployed controllably, simultaneously, and uniformly in order not to affect the stability of the satellite 10. The support structures 12 and 14 are deployed through the release of stored mechanical strain energy which acts against the satellite 10 and on the support structures 12 and 14. The structures 12 and 14 are precluded from deployment, when they are in the folded or non-deployed position as illustrated in FIG. 1, by a pair of yo-yo despin cables 18 shown in FIG. 1 wrapped around the external surfaces of the solar panel arrays 16. When the yo-yo despin cables 18 are released from the position illustrated in FIG. 1, the cables 18 are cast off and the stored mechanical strain energy forces the deployable support structures 12 and 14 outwardly into an erected or deployed position as illustrated in FIG. 2. During the deployment of the mechanically rotatable deployable support structures 12 and 14, the solar panel arrays 16 associated therewith are rotated about the respective longitudinal axes thereof into a pre-selected position as illustrated in FIG. 2. The electrically rotatable deployable support structures 14 are not initially rotated as a result of deployment but can be selectively rotated, as hereinafter described, through use of the pair of electrical drive motors operably connected therewith.

The yo-yo despin cables 18 each preferably comprise a sufficient length of 3/64 inch cable to wrap around the satellite 10 twice and operate in a conventional manner. The cables are fitted with weights, not illustrated, on the ends thereof which are retained in position by an auxiliary cable, also not illustrated. Prior to separation of the satellite 10 from a launch vehicle, the satellite 10 is spun up to approximately 150 rpm and then is released. The yo-yo despin cables 18 take out the spin of the satellite 10 after the auxiliary cables are cut by a cable cutter assembly, not illustrated, in approximately one second and the deployable support structures 12 and 14 and therefore the solar panel array 16 deploy in approximately one more second. The cable cutter is well known in the art and can use a conventional pyrotechnic mechanism or another suitable mechanism to effect cutting of the auxiliary cable. As is characteristic of spin stabilization satellites of this type, the center of gravity of the structure must be within 1/16 of an inch of the theoretical center of gravity in order for the satellite to operate properly. Therefore, the deployable support structures 12 and 14 which support the solar panels 16 must be exactly placed. This is accomplished through the use of the present invention, as previously described. The mechanisms and functioning of the deployable support structures 12 and 14 will be hereinafter described in detail.

Figures 3, 4:
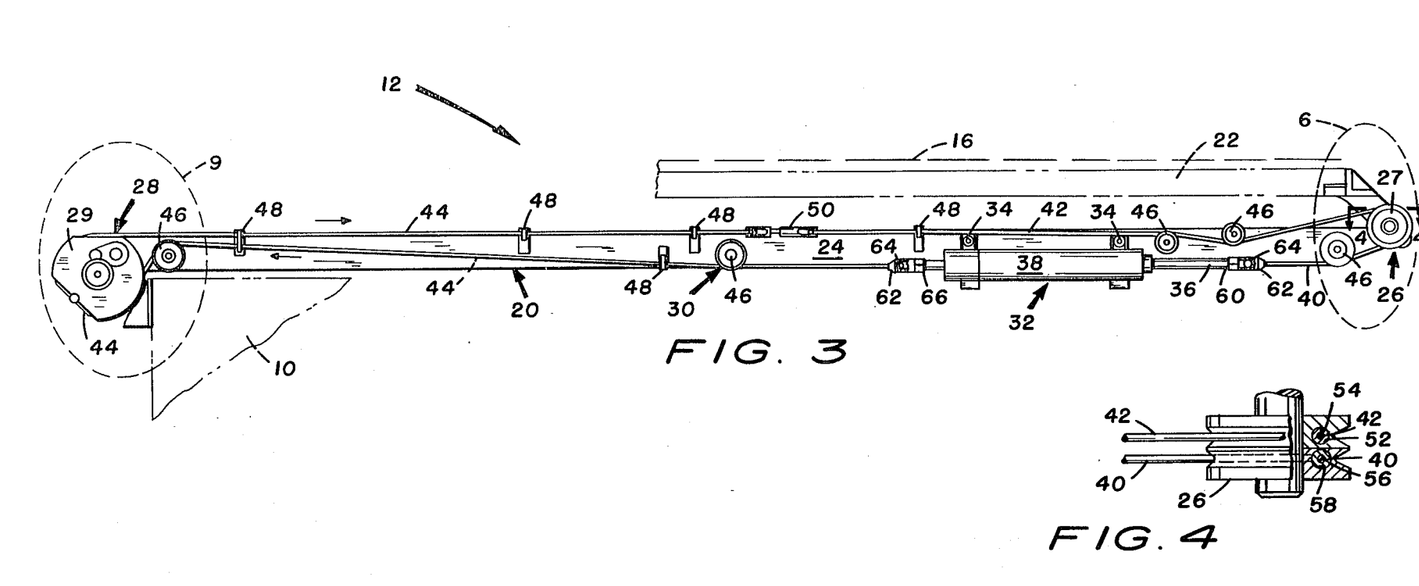
FIG. 3 is a fragmentary side view of one embodiment of the present invention.
FIG. 4 is an enlarged fragmentary view, partially broken away, of FIG. 3 viewed from the lines 4—4 thereof.

With reference to FIG. 3, there is illustrated therein one of the mechanically-rotatable deployable support structures 12 illustrative of both of these structures. The structure 12 comprises an elongated arm 20 providing a support section 22 and a mounting section 24 joined together on one end respectively thereof by a driven pivot assembly 26 having a drive pulley 27. The other end of the mounting section 24 is mounted to the satellite 10 by a driven pivot and mounting assembly 28. When the drive pulley 27 of the driven pivot assembly 26 is rotated, the support section 22 is moved into a position substantially coextensive to the mounting section 24 as illustrated in FIG. 2. Similarly, when the pulley portion 29 of the driven pivot and mounting assembly 28 is driven, the mounting section 24 is rotated from a position substantially adjacent to the satellite 10 as illustrated in FIG. 1 into a position extensible from the sattellite 10 as illustrated in FIG. 2. Aside from the rotation of the mounting section 24 about a pivot axis to position it so that it projects from the satellite 10, the driven pivot and mounting assembly 28, through a gearing mechanism hereinafter described in conjunction with FIGS. 7 and 8, rotates about a second axis perpendicular to the first so that the mounting section 24 rotates about its longitudinal axis which coincides with the second axis.

Rotation of the drive pulley 27 of the driven pivot assembly 26 and driving of the pulley portion 29 of the driven pivot and mounting assembly 28 is accomplished through engagement of the drive pulley 27 and the pulley portion 29 by a cable and pulley system 30 which forms a closed loop, the closed loop being rotatably positionable by the inclusion therein of a linearily directed mechanical biasing means embodied in a deployment cylinder 32 which is fixedly secured to the mounting section 24 by a pair of mounting screws 34.

The deployment cylinder 32 provides a rod 36 which reciprocates under certain circumstances within a housing 38 of the deployment cylinder 32 as hereinafter described in conjunction with FIG. 5. The cable and pulley system 30 comprises cable segments 40, 42, and 44, which are supported by a plurality of rotatably-mounted pulleys 46, each which are rotatably affixed by suitable means to the mounting section 24 of the support structure 12. The cable segments 40, 42, and 44 are additionally supported by a plurality of cable guides 48 which are each provided with an aperture disposed therethrough to capture and slideably position adjacent portions of the cable segments 40, 42, and 44. One end of the cable segment 42 is fixedly secured to a turnbuckle 50. The segment 42 passes through a cable guide 48 and around two pulleys 46 before it engages the drive pulley 27. The second end of the cable segment 42 has a ball 52 swaged, or otherwise fixedly secured, on the end thereof as illustrated in FIG. 4. The ball 52 is captured and therefore fixedly secured in a chamber 54 machined or otherwise provided in the drive pulley 27 thereby securing the end of the cable segment 42 to the driven pivot 26. The segment 40 of the cable is similarly affixed on one end thereof to the driven pivot 26 by a ball 56 captured in a chamber 58. The other end of the cable segment 40 is fixedly secured to an end 60 of the rod 36 by a coaxial clamp 62 which captures and retains therein a ball 64 fixedly secured to the end of the cable segment 40. The other end 66 of the rod 36 is fixedly secured to an end of the cable segment 44 by a second coaxial clamp 62 and ball 64 captured by the clamp 62. The cable segment 44 is threaded past a pulley 46 through a cable guide 48, then through a second cable guide 48, around a second pulley 46 and then around the outer surface of the pulley portion 29 of the driven pivot and mounting assembly 28. The cable segment 44 engages the pulley portion 29 as hereinafter described in conjunction with FIGS. 9 and 10 and then engages several cable guides 48. The second end of the cable segment 44 is fixedly secured to the turnbuckle 50. As a result, the loop previously described is formed. It should be apparent that the cable and pulley system 30 can include various numbers or configurations of guides 48 and pulleys 46 or other functionally equivalent elements at the discretion of the user.

When the rod 36 of the deployment cylinder 32 shifts toward the driven pivot and mounting assembly 28, through the operation thereof as will be hereinafter described, the loop formed by the cable and pulley system 30 shifts in a clockwise direction with reference to the illustration in FIG. 3. This shift causes a force to be imparted on the pulley portion 29 of the driven pivot and mounting assembly 28 as well as rotation of the drive pulley 27 causing deployment of the deployable support structure 12.

Figure 5:
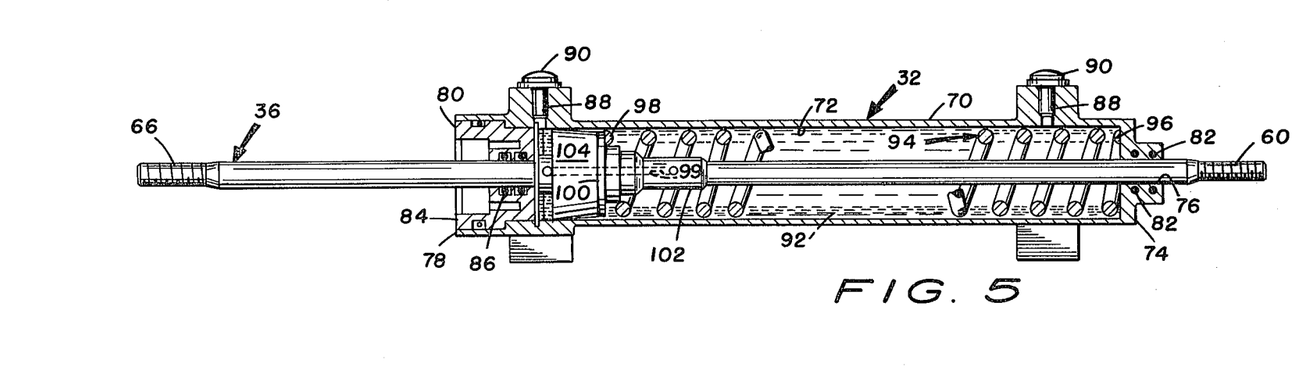
FIG. 5 is an enlarged cross-sectional view of the deployment cylinder of the present invention.

Referring to FIG. 5, the deployment cylinder 32 comprises a hollow cylinder 70 which forms a longitudinal chamber 72 therein. The cylinder 70 is configured at one end 74 thereof to form an aperture 76. The other end 78 of the cylinder 70 forms an aperture 80, the aperture 80 being aligned with the aperture 76. The rod 36 is of a length greater than that of the cylinder 70 and is slideably disposed within the cylinder 70 with the ends 60 and 66 of the rod 36 extending outwardly therefrom. A pair of O rings 82 are mounted in a conventional manner at the end 74 of the cylinder 70 to effect a sliding seal between the walls of the cylinder 70 and the exterior surface of the rod 36. An insert 84 is disposed in the aperture 80 to narrow the diameter of the same to approximately that of the rod 36. A pair of O rings 86 are mounted in the insert 84 in a conventional manner to create a sliding seal between the insert 84 and the exterior surface of the rod 36. The insert 84 is fixedly secured to the cylinder 70 and is tightly sealed thereto. As a result, the longitudinal chamber 72 formed by the cylinder 70 is effectively sealed from the outside environment by the O rings 82 and 86 and the rod 36. A pair of fill holes 88 in communication with the longitudinal chamber 72 permit access thereto from the surroundings of the deployment cylinder 32 and are provided with removably affixable seals 90. The fill holes 88 are provided so that the longitudinal chamber 72 can be filled with silicone oil 92 or the like. In preparation for use of deployment cylinder 32, both the seals 90 would be removed so that the oil can be poured into one of the fill holes 88 with the other fill hole 88 acting as a vent. Once the longitudinal chamber 72 is filled with silicone oil both seals 90 are placed in position. The silicone oil 92 preferably comprises a 50/50 blend of 600 CSS and 8,000 CSS F6-1100 Dow Corning Silicone fluid but other viscous liquids having suitable properties may be employed.

The deployment cylinder 32 is illustrated in FIG. 5 in a rest position, i.e., the position it obtains after deployment. Since the deployment cylinder 32 must urge the rod 38 thereof in what would be a right to left position viewing FIG. 5, a helical compression spring 94 is disposed within the chamber 72 about the rod 38 to permit this action. A first end 96 of the spring 94 abuts against the end 74 of the cylinder 70 with the other end 98 of the spring 94 abutting against a stop 100 fixedly secured to the rod 36 by a collar assembly 102. A conventional oil cup 104 is fixedly secured to the stop 100. When the rod 36 is moved from a left to right position and is held in that position, energy is stored in the compression spring 94. When the rod 36 is permitted to move from right to left the oil cup 104 interacts with the silicone oil 92 within the longitudinal chamber 72 and dampens the movement of the rod 36 until it reaches its rest position as illustrated in FIG. 5. Passage of the oil from one side of the cup 104 to the other side thereof upon reciprocation of the rod 36 takes place through a port 99 disposed through the rod 36 and the collar assembly 102.

When the mechanically rotatable deployable support structure 12 is in a folded position, as illustrated in FIG. 3, and is maintained in that position, the rod 36 is placed in a position, previously described, which causes the helical compression spring 94 to store energy. As long as the mechanically rotatable deployable support structure 12 is held in this folded condition by the yo-yo spin cables 18 previously described and illustrated in FIG. 1, the support structure 12 is maintained in a folded position since the rod 36 of the deployment cylinder 32 cannot move. When the yo-yo spin cables 18 are removed and the deployable support structure 12 is no longer restrained, the deployment cylinder 32 can cause rotation of the loop formed by the cable and pulley system 30. As a result, the rod 36 moves from a right to left position, with reference to FIGS. 3 and 5, causing clockwise shifting of the cable segments 40, 42 and 44 formed into the described loop which in turn acts upon the driven pivot and mounting assembly 28 and the driven pivot assembly 26 to cause deployment of the support structure 12. Once the support structure 12 is deployed, if the silicone oil 92 is subjected to a low enough temperature, customarily found in outer space where the satellite 10 would be deployed, the silicone oil 92 freezes and locks the rod 36 and therefore the entire support structure 12 in position.

Although the rod 36 in the deployment cylinder 32 is described as employing a helical compression spring 94 for movement, other suitable biasing means may be employed. Similarly, differently configured linear actuating means can be used instead of the deployment cylinder 32. The electrically rotatable deployment support structure 14 is similar to the deployable support structure 12 in that it is deployed in a similar manner by a deployment cylinder and cable and pulley system.

Figure 6:
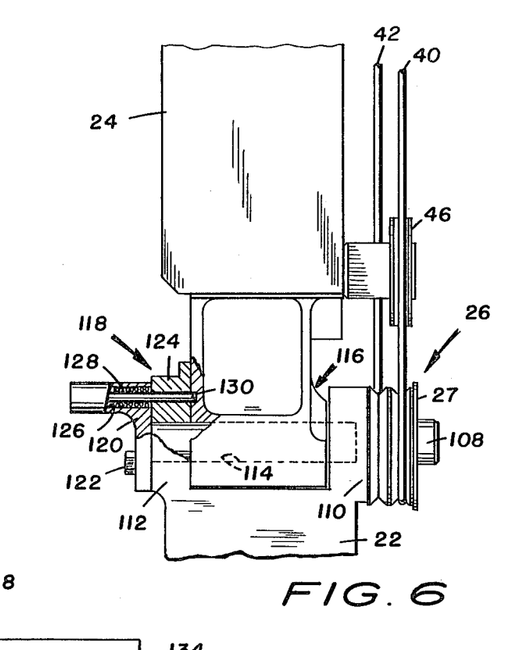
FIG. 6 is an enlarged partial top view of the illustration of the driven pivot of FIG. 3 shown within the dashed line 6 thereof, with the support structure in a deployed locked position.

The manner in which the driven pivot assembly 26 permits extension of the support section 22 in relation to the mounting section 24 can best be explained in conjunction with the illustration of FIG. 6. FIG. 6 illustrates a portion of the deployable support structure 12 in an open, locked position as opposed to FIG. 3 which illustrates the structure 12 in a closed, folded position. The support section 22 can be seen to be locked into a position substantially co-extensive with the mounting section 24. The sections 22 and 24 are joined together by the driven pivot assembly 26. The driven pivot assembly 26 includes a drive pulley 27 fixedly secured by a fastener 108 to an edge 110 of a bight portion 112 formed by the support section 22. A pivot rod 114 is mounted between the opposed sides of the bight portion 112 of the support section 22 and serves as a structure with which a collar section 116 formed by the support section 22 can journal. The collar 116 is disposed in between the sides of the bight portion 112 and retains the same therebetween. Sufficient clearance is provided between the inner edges of the bight portion 112 and the outer edges of the collar 116 to permit rotation of the collar 116 within the bight portion 112.

As described in conjunction with FIG. 4, the cables segments 40 and 42 are fixedly secured on the ends thereof to the drive pulley 27. By movement imparted to the cable and pulley system 30, as hereinbefore described, the mounting section 24 is driven into position as shown. When this position is reached, a locking assembly 118 locks the mounting section 24 in relation to the support section 22. The locking assembly 118 comprises a housing 120 which is fixedly secured to an outer surface of the support section 22 by a bolt 122. A locking pin 124 which resides within a chamber 126 longitudinally located within the housing 120 is driven by a compression spring 128 toward the mounting section 24. When the chamber 126 aligns with a capturing aperture 130 disposed in the mounting section 24 adjacent to the collar 116 thereof, the locking pin 124, urged by the spring 128 enters the capturing aperture 130 and locks the sections 22 and 24 relative to each other. The pulling action of the cable segment 40 and the pushing action of the cable segment 42 upon the drive pulley 27 causes relative movement between the sections 22 and 24.

Figure 7:
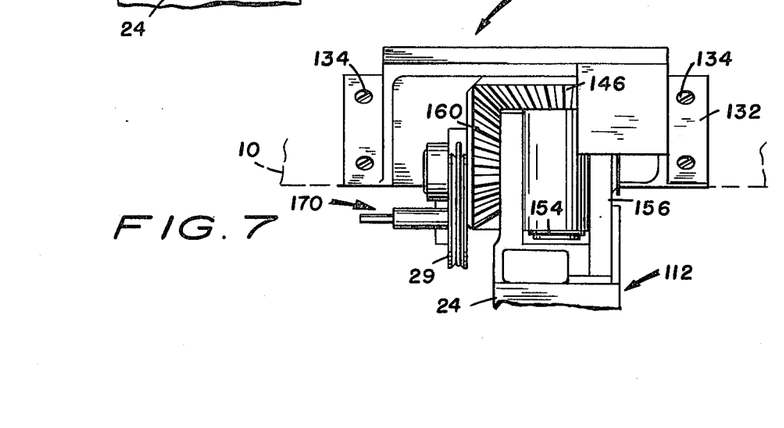
FIG. 7 is a fragmentary top view of the pivot and mounting assembly of the embodiment of FIG. 3 in a pre-deployment condition.
Figure 8:
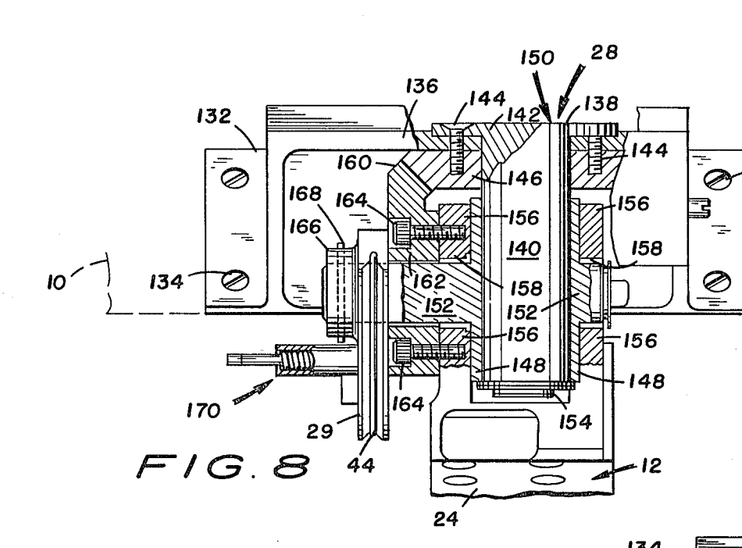
FIG. 8 is an enlarged partially sectioned top view of the illustration of FIG. 7.

FIGS. 7 and 8 illustrate the driven pivot and mounting assembly 28 which includes a mounting bracket 132 that fixedly secures the assembly 28 and therefore the deployable support structure 12 to the satellite 10. The mounting bracket 132 is secured to the satellite 10 by a plurality of bolts 134 although other suitable fasteners may be employed. The mounting bracket 132 provides a flange 136 having a mounting aperture 138 disposed therethrough. A pivot shaft 140 extends through the mounting aperture 138 and is mounted by a flange 142 integrally formed with the pivot shaft 140 to the mounting bracket 132 by mounting screws 144. The mounting screws 144 also secure a first bevel gear 146 to the mounting bracket 132. The pivot shaft 140 journals with the interior of a sleeve portion 148 of a support 150 which also includes a shaft portion 152 integrally formed with the sleeve portion 148. The shaft portion 152 is substantially perpendicular to the sleeve portion 148 and extends on both sides thereof but not through the interior of the sleeve portion 148. The sleeve portion 148 is retained on the pivot shaft 140 by a conventional locking ring and washer assembly 154 in such a manner that the support 150 can rotate freely about the pivot shaft 140.

The mounting section 24 of the support structure 12 provides a substantially U-shaped portion 156 which accommodates the sleeve portion 148 of the support 150 therebetween in such a manner so that a pair of aligned apertures 158 disposed through the U-shaped portion 156 can accommodate the shaft portion 152 of the support 150 therethrough. As a result, the shaft portion 152 of the support 150 journals with the aligned apertures 158 so that mounting section 24 of the support structure 12 can freely rotate therearound. The adjacent surfaces of the exterior of the sleeve portion 148 and the U-shaped portion 156 are coated with a suitable lubricant to prevent binding. The shaft portion 152 and the pivot shaft 140 are similarly coated. A second bevel gear 160 having a central aperture 162 disposed therethrough resides about the shaft portion 152 with the central aperture 162 engaging the same in a manner that permits rotation of the second bevel gear 160 about the shaft portion 152. The second bevel gear 160 is fixedly secured to the U-shaped portion 156 of the support section 22 by a pair of bolts 164 so that when the support section 22 rotates about the shaft portion 152 so does the second bevel gear 160. The teeth of the second bevel gear 160 operably engage the teeth of the first bevel gear 146 as illustrated.

The pulley portion 29 of the driven pivot and mounting assembly 28 provides a mounting collar 166 which accommodates a portion of the shaft portion 152 therethrough. A pin 168, installed in a conventional manner, pins the collar 166 to the shaft portion 152 locking these two elements together. As a result, when force is placed on the cable segment 44 by the deployment cylinder 32 as illustrated in FIG. 3, the mounting section 24 is forced to rotate about the shaft portion 152 of the support 150. Simultaneously, as a result of this rotation, the second bevel gear 160, through engagement of the first bevel gear 146, walks up the first bevel gear 146 causing rotation of the mounting section 24 about the pivot shaft 140. As a result, the mounting section 24, observed in FIG. 8, will end up in a position wherein it is rotated substantially about its longitudinal axis and also will become substantially perpendicular to the plane in which it lies before deployment. A locking assembly 170, which operates in the same manner as the locking assembly 118 illustrated in FIG. 6, is provided to lock the mounting section 24 in position after deployment.

Figure 9:
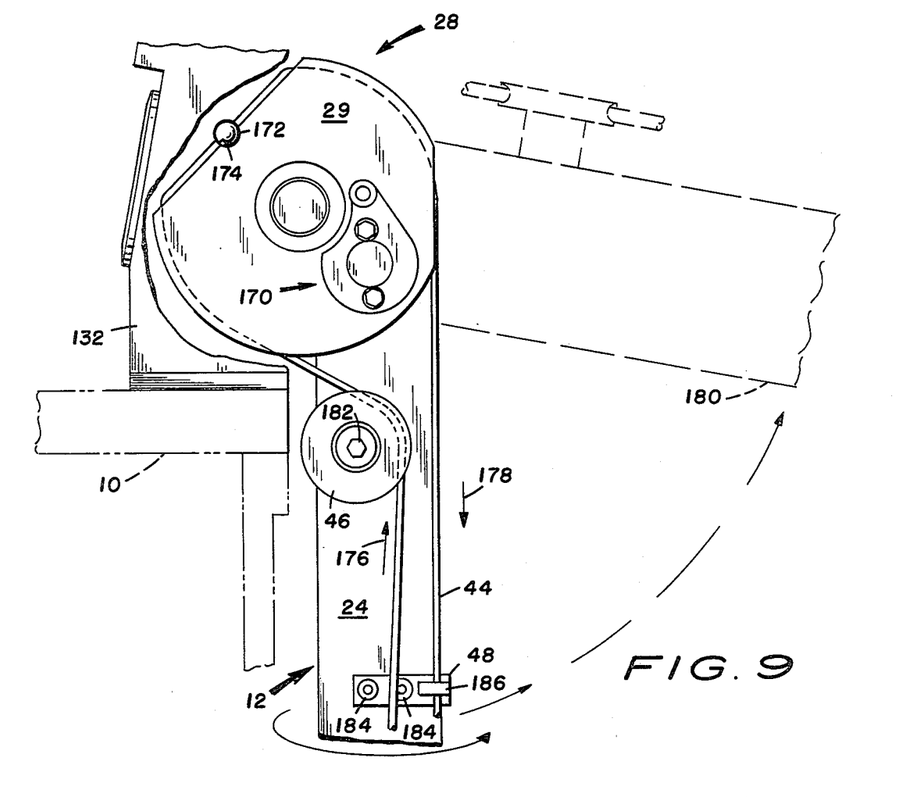
FIG. 9 is an enlarged fragmentary side view of a portion of the embodiment of FIG. 3 shown within the dashed line 9 thereof.
Figure 10:
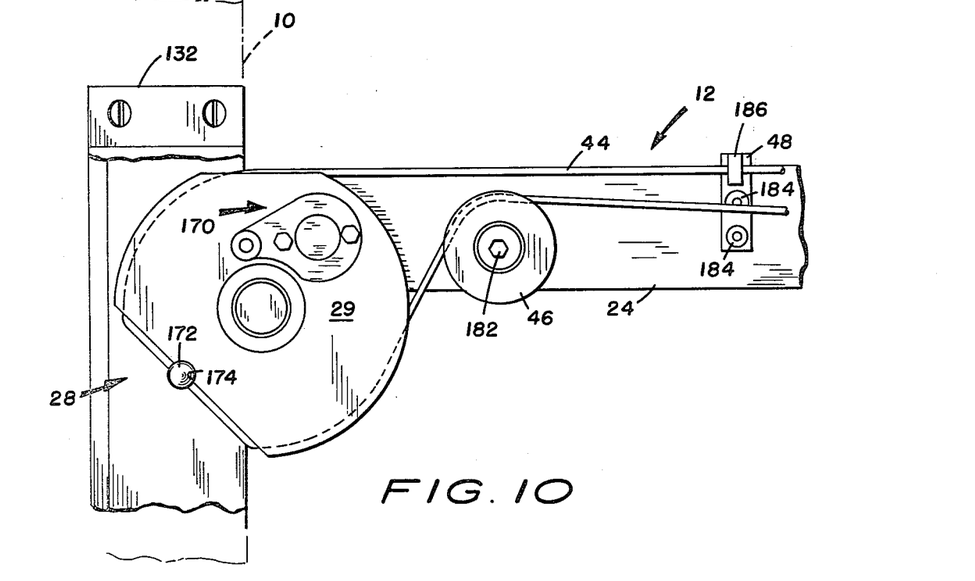
FIG. 10 is a top view of the embodiment illustrated in FIG. 9 in a deployed condition.

FIGS. 9 and 10, respectively, show the mounting section 24 in pre and post deployment positions. The mounting bracket 132 is illustrated fixedly securing the driven pivot and mounting assembly 28 to the spacecraft 10. The pulley portion 29 of the driven pivot and mounting assembly 28 engages the cable segment 44 in a positive manner since a ball 172 is fixedly secured to the cable segment 44 and is captured and retained within an aperture 174 disposed in the pulley portion 29. This results in movement of the cable 44 causing the exertion of forces on the pulley portion 29. When the cable segment 44 is acted upon by the deployment cylinder 32, a pushing force is delivered in the direction of the arrow 176 and a pulling force is delivered in the direction of the arrow 178, both acting upon the pulley portion 29. Since the pulley portion 29 is mounted to the support 150 as illustrated in FIG. 8, the mounting section 24 of the support structure 12 is urged into a position as shown in FIG. 10 through several intermediate positions in rapid sequence, one of which is illustrated by phantom lines 180 in FIG. 9. As discussed in conjunction with FIG. 3, one pulley 46 and one cable guide 48 are illustrated. Although just one pulley 46 and one cable guide 48 are illustrated, they are representative of the other such elements. The pulley 46 is pivotally mounted to the mounting section 24 by a bolt 182. The cable guide 48 is secured to the mounting section 24 by a pair of fasteners 184 and includes a guide ring 186 through which the cable 44 passes. As FIG. 9 is a side view and FIG. 10 a top view, it can be seen that the mounting section 24 and therefore the elongated arm 20 is rotated about the longitudinal axis thereof on a first pivotal axis and also is rotated about a second pivotal axis into a position extensible from said spacecraft 10.

Figure 11:
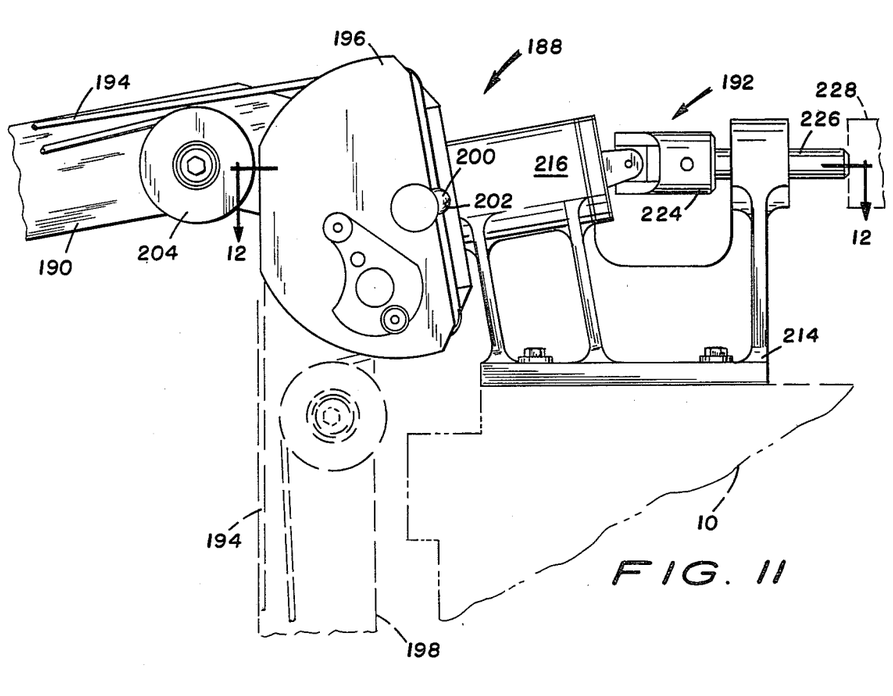
FIG. 11 is a fragmentary side view of an alternate embodiment of the present invention.
Figure 12:
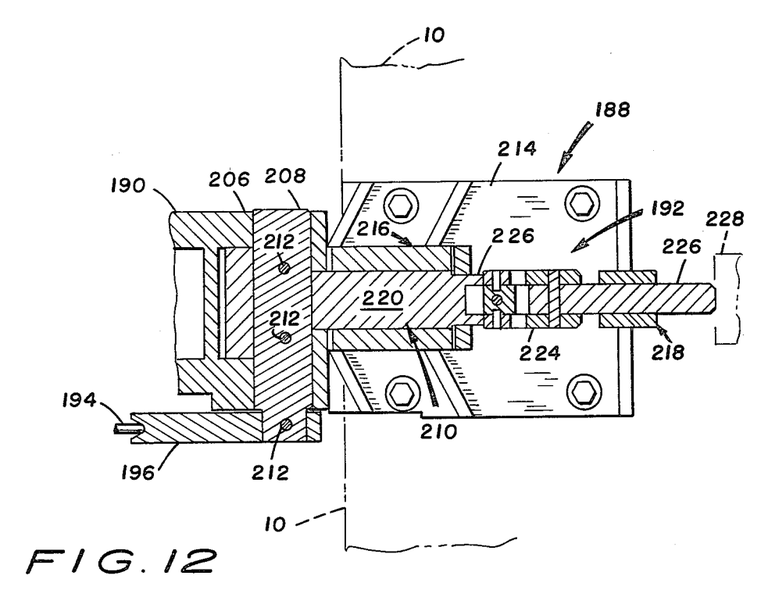
FIG. 12 is a cross-sectional view taken substantially along the lines 12—12 of FIG. 11.

FIGS. 11 and 12 illustrate a portion of one of the electrically rotatable deployable support structures 14. The electrically rotatable deployable support structures 14 are similar to the mechanically rotatable deployable support structures 12 in every respect except for the driven pivot and mounting assembly 28. Therefore, only this portion of the deployable support structure 14 which is different and corresponds to the assembly 28 of the structure 12 is illustrated. The deployable support structure 14 includes a driven pivot and mounting assembly 188 which permits extension of a mounting section 190 of the deployable support structure 14 into a position extensible from the satellite 10. The driven pivot mounting assembly 188 differs from the driven pivot and mounting assembly 28 in that rotation about the longitudinal axis of the respective mounting sections 190 and 24 is not accomplished automatically and mechanically as in the support structure 12 but a drive assembly 192 is provided so that the mounting section 190 can be rotated as desired after deployment. Aside from this difference, the deployable support structure 14 includes a support section similar to the support section 22 of the deployable support structure 12 as illustrated in FIG. 3. Upon activation of a deployment cylinder, not illustrated, similar to deployment cylinder 32 illustrated in FIGS. 3 and 4, a cable segment 194 is acted upon in the same manner as the cable segment 44 of FIGS. 9 and 10. The cable segment 194 is secured to a pulley portion 196 similar to pulley portion 29 and the mounting section 190 is therefore moved from a folded position illustrated by phantom lines 198 in FIG. 11 into an erected or extended position as shown upon deployment. The cable segment 194 is secured to the drive pulley 196 by a ball 200 captured in an aperture 202 disposed in pulley portion 196 and is positioned by a pulley 204, among others not illustrated which operate in the same manner as the pulleys 46 illustrated in FIGS. 3, 9, and 10, to position cable segment 44.

With specific reference to FIG. 12, mounting section 190 provides a sleeve portion 206 which freely rotates about a pivotal shaft 208 provided by a support 210. The pulley portion 196 is fixedly secured to one end of the pivotal shaft 208 by a set of pins 212 and when the cable segment 194 is acted upon, as described, the sleeve portion 206 rotates about the pivotal shaft 208 moving the mounting section 190 and therefore the support structure 14 into a position projecting from the spacecraft 10. The driven pivot and mounting assembly 188 is mounted to the satellite 10 by a bracket 214 providing a first journal 216 and a second journal 218. The first journal 216 mounts and rotatably supports the support 210 by engaging the rod portion 220 thereof which is fixedly secured to the pivotal shaft 208 thereof. The rod portion 220 freely rotates within the first journal portion 216 and is coated with a suitable lubricant well known in the art. An end 226 of the rod portion 220 is coupled by a universal joint 224, of conventional design, to one end of a drive rod 226. The drive rod 226 is supported, journals, and is freely rotatable within the second journal 218 provided by the bracket 214. The other end of the drive rod 226 is operably coupled to an electrical motor 228 or the like, preferably of the reversible type. When the motor 228 is energized, it causes the drive rod 226 to rotate within the second journal 218. Rotation is imparted to the Universal joint 224 which translates this rotation to the rod portion 220 of the support 210. As a result, the pivotal shaft 208 is rotated and therefore so is the mounting section 190 about the longitudinal axis thereof.

It should be realized that the electrically rotatable deployable support structure 14 is placed into an extended position relative to the satellite 10 through the mechanical action of a deployment cylinder and that rotation about the longitudinal axis of the support structure 14, once it has been deployed, is accomplished by energizing the electrical motor 228.

It will be understood that various changes in the details, materials, arrangement of parts, and operational conditions which have herein described and illustrated in order to explain the nature of the invention may be made by those skilled in the art within the principles in scope of the invention.

Having thus set forth the nature of the invention, what is claimed is:

1. A deployable support structure for use in conjunction with a spacecraft comprising:
    an elongated arm providing a supporting surface;
    first driven pivot means for pivotally connecting one end of said arm to said spacecraft, said first driven pivot means including a drive pulley, said arm being positionable adjacent to said spacecraft and extensible therefrom upon driving of said drive pulley of said first driven pivot means;
    linear actuator means for mechanically storing and selectively releasing energy, said linear actuator means having a movable assembly defined by two spaced apart preselected points identifiable thereon, release of the energy stored by said linear actuator means causing said assembly to move, each of said two points shifting a preselected distance along a straight line in the same direction upon said movement; and
    means for coupling said linear actuator means to said drive pulley of said first driven pivot means, said coupling means comprising a length of flexible cable forming a loop, said cable operably engaging said drive pulley and being affixed on the ends thereof to said first and second preselected points, releasing of energy from said linear actuator means thereby driving said first driven pivot means.

2. A deployable support structure in accordance with claim 1, wherein said arm comprises a first section and a second section, second driven pivot means being provided for pivotally connecting said first section to said second section, said first section being pivotally connected to said spacecraft by said first driven pivot means, said second section being positionable adjacent to said first section and substantially parallel thereto, said second section being extensible from said first section upon driving of second driven pivot means, said coupling means coupling said linear actuator means to said second driven pivot means, releasing of energy from said linear actuator means thereby simultaneously driving said first and second driven pivot means.

3. A deployable support structure in accordance with claim 2, wherein said first driven pivot means rotates said arm substantially about the longitudinal axis thereof a preselected degree during the extension of said arm relative to said spacecraft.

4. A deployable support structure in accordance with claim 3, wherein said first driven pivot means comprises a pair of independent first and second rotation axes, said longitudinal axis of said arm rotating substantially about said first axis, said arm being extensible by rotation thereof about said second axis, a beveled gear arrangement causing rotation of said arm about said first axis.

5. A deployable support structure in accordance with claim 2, further comprising means for locking said first and second sections of said arm in position after the respective rotations thereof.

6. A deployable support structure in accordance with claim 2, wherein said movable assembly of said linear actuator means comprises a movable element, said first and second spaced apart preselected points being identifiable thereon, said points each moving said preselected distance upon movement of said element, and means from moving said element.

7. A deployable support structure in accordance with claim 6, wherein said second driven pivot means comprises a drive pulley, exertion of force on said drive pulleys pivoting said first and second sections associated therewith, said cable operably engaging each of said drive pulleys whereby releasing of said linear actuator means shifts said loop of cable exerting said force on said drive pulleys.

8. A deployable support structure in accordance with claim 7, further comprising a plurality of pulleys rotatably secured to selected locations on said elongated arm, said pulley engaging said loop of cable for the guiding and supporting thereof.

9. A deployable support structure in accordance with claim 7, further comprising a plurality of balls fixedly secured to said cable at preselected locations, and a plurality of complementary apertures disposed in said drive pulleys, said apertures situated and dimensioned to capture and retain therein said balls.

10. A deployable support structure in accordance with claim 1, wherein said first driven pivot means comprises a pair of independent first and second rotation axes, said arm being extensible by the rotation thereof about said first axis as a result of energy imparted thereto by said linear actuator means through said coupling means, the longitudinal axis of said arm being rotatable about said second axis, and drive means operably connected to said arm for selectively causing the rotation thereof about said second axis.

11. A deployable support structure in accordance with claim 10, wherein said drive means comprises an electric motor.

12. A deployable support structure in accordance with claim 10, further comprising means for locking said arm subsequent to the rotation thereof about said first axis.

13. A deployable support structure in accordance with claim 1, wherein said linear actuator means comprises a linearly directed mechanical biasing mechanism.

14. A deployable support structure in accordance with claim 13, wherein said linearly directed mechanical biasing mechanism comprises:
a hollow cylinder forming a longitudinal chamber therein, said cylinder having an aperture disposed at either end thereof, said apertures being aligned;
means for mounting said cylinder to a selected surface;
a rod of a length greater than the length of said cylinder, said rod being slideably disposed in said cylinder and extending outwardly therefrom through said apertures; and
spring bias means disposed within said longitudinal chamber for urging said rod in a preselected direction relative to said cylinder.

15. A deployable support structure in accordance with claim 14, further comprising:
seals for sealing said apertures about said rod, said seals permitting the free sliding of said rod therethrough:
viscous liquid disposed within said longitudinal chamber; and
dampening means fixedly secured to a portion of said rod disposed within said chamber, the movement of said dampening means through said viscous liquid dampening the movement of said rod.

16. A deployable support structure in accordance with claim 14, wherein said spring bias means comprises a helical compression spring disposed about said rod within said chamber, one end of said spring being fixedly secured to said rod, the other end of said spring positively engaging an interior surface of said cylinder.

17. A deployable support structure in accordance with claim 14, wherein said mounting means mounts said hollow cylinder on said elongated arm.

18. A deployable support structure in accordance with claim 14, further comprising means for locking said rod in a preselected position relative to said cylinder subsequent to the urging of said rod in said preselected direction.

19. A deployable support structure in accordance with claim 1, further comprising means for controlling the releasing of energy from said linear actuator.

20. A deployable support structure for use in conjunction with a spacecraft comprising:
first and second arms each providing a supporting surface and each including a first and second section;
a first pair of driven pivot means for pivotally connecting one end of each of said first sections to said spacecraft, each of said first pair of driven pivot means including a drive pulley, each of said first sections being positionable adjacent to said spacecraft and extensible therefrom upon driving of said drive pulleys of said first driven pivot means;
a second pair of driven pivot means being provided for pivotally connecting said first sections to said second sections of corresponding said arms, each of said second sections being positionable adjacent to associated said first sections and substantially parallel thereto, each of said second pair of driven pivot means including a drive pulley, each of said second sections being extensible from said associated sections upon driving of associated said drive pulleys of said second driven pivot means;

linear actuator means for mechanically storing and selectively releasing energy, said linear actuator means having a movable assembly defined by two spaced apart preselected points identifiable thereon, release of the energy stored by said linear actuated means causing said assembly to move, each of said two points shifting a preselected distance along a straight line in the same direction upon said movement; and means for coupling said linear actuator means to said drive pulleys of said pairs of first and second driven pivot means, said coupling means comprising a length of flexible cable forming a loop, said cable operably engaging said drive pulleys and being affixed on the ends thereof to said first and second preselected points, releasing of energy from said linear actuator means thereby simultaneously driving said first and second driven pivot means.

* * * * *